United States Patent Office 3,105,086
Patented Sept. 24, 1963

3,105,086
ALKALINE REARRANGEMENT OF HYDROCARBON-SUBSTITUTED SILANES
John W. Ryan, Midland, Mich., assignor to Dow Corning Corporation, Midland, Mich., a corporation of Michigan
No Drawing. Filed Mar. 28, 1961, Ser. No. 98,778
2 Claims. (Cl. 260—448.8)

This invention relates to a method for rearrangement of silicon-bonded lower alkyl radicals and phenyl radicals on alkoxylated silane silicon atoms by heating the silanes in a closed system with an alkali metal base to produce some different silanes having more or different silicon-bonded lower alkyl radicals and phenyl radicals per silicon atom than the original silanes. This application is a continuation-in-part of my copending application Serial No. 51,539, filed August 24, 1960, now abandoned.

In the preparation of hydrocarbon-substituted silanes by the direct process the product is a mixture of mono-, di- and tri-hydrocarbon-substituted silanes. Since the organopolysiloxanes prepared from the di- and tri-hydrocarbon-substituted silanes are presently more commercially desirable than the organopolysiloxanes prepared from mono-hydrocarbon-substituted silanes, there has developed a need for some method of converting mono-hydrocarbon-substituted silanes to di- and tri-hydrocarbon-substituted silanes. Various methods of disproportionation have been produced for this conversion with alkali metal alkoxide catalysts, for example, where the silicon-bonded hydrocarbon radicals were phenyl radicals as in U.S. Patent 2,723,984 or allyl or butenyl radicals as in U.S. Patent 2,723,985, but no method has been developed for similarly-catalyzed disproportionation of alkyl-substituted silanes, especially methyl-substituted silanes.

One of the objects of this invention is to provide a method for disproportionating lower alkyl-substituted silanes, alone or with phenyl-substituted silanes. Another object of this invention is to provide such a method wherein di- and tri-hydrocarbon-substituted silanes are produced differing from their mono- and di-hydrocarbon-substituted reactants. Another object is to provide a method for preparing silanes containing both phenyl and lower alkyl radicals from mixtures of phenyl-substituted silanes and alkyl-substituted silanes. Another object is to provide such methods which do not cause extensive destruction of the silicon-bonded lower alkyl groups. These objects as well as others which are apparent from the following description are satisfied by this invention.

This invention relates to the method which comprises heating at a temperature greater than 200° C. a mixture of (A) silanes of the formula $R_aSi(OR')_{4-a}$ in which each R is a methyl, ethyl, propyl, isopropyl, or benzyl radical, each R' is a methyl or ethyl radical and each $a$ is 1, 2, 3 or 4, but the average value of $a$ is less than 4, and from about 0.1 to about 20 percent by weight based on the weight of A of (B) an alkali metal base whereby silanes other than A are produced having the formula $R_nSi(OR')_{4-n}$ in which each $n$ is 2 or 3, R and R' are as defined above.

Component A in the method of this invention consists of silanes of the general formula $R_aSI(OR')_{4-a}$ in which each R can be a methyl, ethyl, propyl, isopropyl, benzyl or phenyl radical, each R' can be a methyl or ethyl radical and $a$ can be 1, 2, 3 or 4. At least some and preferably a substantial portion, e.g. 30 percent of the silane reactants must contain only methyl, ethyl, propyl, isopropyl or benzyl R radicals to satisfy the objects of this invention. All of the R radicals can be such radicals if desired. Examples of typical silanes which can be employed in the method of this invention include:

$CH_3Si(OCH_3)_3$, $C_2H_5Si(OCH_3)_3$, $C_3H_7Si(OCH_3)_3$
$C_6H_5Si(OCH_3)_3$, $(CH_3)_2Si(OCH_3)_2$
$C_6H_5CH_2Si(OCH_3)_3$, $(C_2H_5)_2Si(OCH_3)_2$,
$(CH_3)_2Si(OC_2H_5)_2$, $(C_6H_5)_2Si(OCH_3)_2$, $(C_6H_5)_4Si$
$CH_3Si(OCH_3)_2(OC_2H_5)$, $(C_2H_5)_3SiOMe$ and
$(CH_3)(C_6H_5)Si(OCH_3)_2$ The average number of silicon-bonded hydrocarbon radicals per silicon atom in the silane reactants, i.e. the average value of $a$, must be less than 4. These examples merely illustrate the variety of silanes which can be employed in the method of this invention.

Component B can be any alkali metal base such as, for example, alkali metal hydroxides such as sodium and potassium hydroxides, alkali metal oxides such as sodium and potassium oxides, alkali metal alkoxides of less than 4 carbon atoms such as lithium methoxide, potassium propoxide, sodium ethoxide, potassium methoxide, and sodium methoxide, alkali metal amides such as sodium amide, potassium amide and lithium amide, alkali metal silanolates such as $(CH_3)_3SiONa$ and $KOSi(CH_3)_2OK$ and alkali metal salts of low molecular weight siloxanols such as $NaO[Si(CH_3)_2O]_4Na$ and $KO[Si(CH_3)_2O]_2K$.

The method of this invention involves in some order mixing components A and B and heating them at a temperature of at least 150° C. The reaction temperature depends primarily on the R radicals present in the system. Phenyl radicals can be cleaved and moved from one silicon atom to another at temperatures of at least 150° C., preferably in the range of 170° C. to 220° C. The lower alkyl radicals require temperatures greater than 200° C., preferably from about 230° C. to about 270° C., for disproportionation. There is no critical maximum temperature except the decomposition temperature of the R radicals, OR' radicals or compounds present in the system. Although this method is operative in a vapor state, it is preferable to operate in a liquid state. This can be done by using a closed system when temperatures above the boiling point of any reactant are employed and by staying below critical temperatures, e.g. 282° C. for methyltrimethoxysilane.

The ratio of B and A can vary a great deal due to the relative activities of the various alkali metal oxides, alkoxides, phenoxides, silanolates and siloxanolates. However, more than about 20 percent by weight of B based on the weight of A is unnecessary although the presence of excess B is not detrimental generally depending on time and temperature conditions. Likewise as little as 0.1 percent by weight of B based on the weight of A can be used under proper conditions of time and temperature. However, at least 1.0 percent by weight of B based on the weight of A is preferred.

The method of this invention has two major variations. One variation involves the system which is free of phenyl radicals and which employs particularly monoalkyltrialkoxysilanes. This variation then relates to the method which comprises heating in a closed system at a temperature greater than 200° C. a mixture of (A) silanes of the formula $R''Si(OR''')_3$ in which each $R''$ is an alkyl radical of less than four carbon atoms and each $R'''$ is an alkyl radical of less than about three carbon atoms and from about 0.1 to about 20 percent by weight based on the weight of A of (B) an alkali metal base whereby silanes other than A are produced having the formula $R''_nSi(OR''')_{4-n}$ in which $R''$ and $R'''$ are as defined above and $n$ is a positive integer ranging in value from 2 to 3. Presently, the commonest system of this type is that in which each $R''$ and $R'''$ are methyl radicals.

The other variation involves the system employing alkylated and phenylated silanes to prepare alkylphenylsilanes. This variation relates specifically to the method which comprises heating in a closed system at a temperature of at least 150° C. a mixture of (A) a mixture of (a) silanes of the formula $R''_a Si(OR''')_{4-a}$ and (b) silanes of the formula $(C_6H_5)_b Si(OR''')_{4-b}$ in which each $R''$ is an alkyl radical of less than four carbon atoms, each $R'''$ is an alkyl radical of less than about three carbon atoms and each $a$ and each $b$ are positive integers ranging in value from 1 to 4, the sum of $a$ and $b$ being less than 8, preferably less than 7, and from about 0.1 to about 20 percent by weight based on the weight of A of (B) an alkali metal base whereby silanes are produced having the formula $(C_6H_5)_b R''_a Si(OR''')_{4-a-b}$ in which $R''$, $R'''$, $a$ and $b$ are as defined above and the sum of $a$ and $b$ is no greater than 3. Presently, the commonest system of this type is that in which each $R''$ and $R'''$ are methyl radicals.

The time of heating in the method of this invention depends on the temperature, the composition of component A, the amount and activity of B, the desired products and the desired yield. For example, the method of this invention produces from monomethyltrimethoxysilane some dimethyldimethoxysilane in less than an hour at 270° C. with 4 percent by weight of sodium oxide based on the weight of the monomethyltrimethoxysilane. On the other hand this method can operate over 100 hours with 1.0 percent by weight of lithium methoxide as component B producing both dimethyldimethoxysilane and trimethylmethoxysilane. Dimethyldimethoxysilane is best produced by the method of this invention by heating in a closed system a mixture of monomethyltrimethoxysilane with about 7 percent by weight of sodium methoxide for from about 4 hours to about 100 hours at from 230 to 270° C., preferably about 22 hours at 270° C. Phenylmethyldimethoxysilane is best produced by the method of this invention by heating a mixture of monomethyltrimethoxysilane and diphenyldimethoxysilane in about equal weight with about 1 percent by weight of sodium methoxide for from about 4 hours to about 100 hours at from 170° C. to about 220° C., preferably about 60 hours at 190° C.

The following examples show some of the possible variations in time, temperature, silanes, alkali metal bases, proportions and products. These examples are merely illustrative and are not intended to limit this invention the scope of which is properly delineated in the claims. The symbols Me, Et, Pr and Ph represent the methyl, ethyl, propyl and phenyl radicals respectively. All quantitative measurements are in parts by weight.

EXAMPLE 1

In each of the following runs 100 parts of (A) methyltrimethoxysilane was mixed with the amount of (B) alkali metal base shown in a stainless steel vessel which was sealed and heated at the temperature and for the time shown. The liquid portion of the reaction product was distilled to separate trimethylmethoxysilane (B.P. 55.5° C.), dimethyldimethoxysilane (B.P. 80.2° C.), methyltrimethoxysilane (B.P. 102° C.) and dimethylether (B.P. −21.6° C.).

The results were as follows:

Table

| Component B | Wt. percent B Based on A | Temp. (° C.) | Time (Hr.) | Mol percent of Me in A present in product as— | | |
|---|---|---|---|---|---|---|
| | | | | $Me_3SiOMe$ | $Me_2Si(OMe)_2$ | $MeSi(OMe)_3$ |
| NaOMe | 2.3 | 230 | 67 | | 15 | 68 |
| [KOSiMe₂]₂O | 6.4 | 270 | 19 | 4 | 26 | 63 |
| Na₂O | 5.9 | 270 | 22 | 4 | 34 | 49 |
| Alkaline Residue free of free sodium resulting from reaction of A with 3.5% B for 22 hr. at 270° C. | No more than 8.3 | 270 | 22 | | 16 | 65 |

EXAMPLE 2

A mixture of 422 parts of $Ph_2Si(OMe)_2$, 239 parts of $PhSi(OMe)_3$ and 766 parts of $Me_2Si(OMe)_2$ was mixed with 5.3 parts of NaOMe in a vessel which was then sealed and heated at 180° C. for 20.75 hours. The system was neutralized (litmus) with $Me_3SiCl$. In addition to unreacted starting materials the reaction product yielded $PhMe_2SiOMe$.

EXAMPLE 3

A mixture of 644.4 parts of $Ph_2Si(OMe)_2$ and 819 parts of $MeSi(OMe)_3$ was mixed with 2.15 parts of NaOMe in 10.63 parts of MeOH (prepared by dissolving 0.9 part of Na in 11.88 parts of MeOH) in a vessel which was then sealed and heated for 60 hours at 190° C. The system was neutralized with $Me_3SiCl$. One product was $$MePhSi(OMe)_2$$

EXAMPLE 4

A mixture of 297 parts of phenyltrimethoxysilane, 204 parts of methyltrimethoxysilane and 4.6 parts of sodium methoxide was heated 19 hours at 190 to 200° C. in a sealed stainless steel vessel. The reaction product was cooled, filtered, neutralized with $Me_3SiCl$. One product was phenylmethyldimethoxysilane.

EXAMPLE 5

When 214 parts of benzyltriethoxysilane are mixed with 1.5 parts of potassium ethoxide and the mixture is refluxed for about 12 hours, one product is dibenzyldiethoxysilane.

EXAMPLE 6

When 100 parts of $PrSi(OMe)_3$ are mixed with 10 parts of the following bases and these mixtures are heated at 220° C. for 20 hours in a closed system, $Pr_2Si(OMe)_2$ is obtained: $LiNH_2$ and $Me_3SiONa$.

EXAMPLE 7

When $Ph_4Si$ is substituted for the $Ph_2Si(OMe)_2$ in Example 3, similar results are obtained.

That which is claimed is:

1. The method which comprises heating in a closed system at a temperature greater than 200° C. a mixture of (A) silanes of the formula $R''Si(OR''')_3$ in which each $R''$ is selected from the group consisting of alkyl radicals of less than about four carbon atoms and the benzyl radical and each $R'''$ is an alkyl radical of less than about three carbon atoms and from about 0.1 to about 20 percent by weight based on the weight of A of (B) an alkali metal base whereby silanes other than A are produced having the formula $R''_n Si(OR''')_{4-n}$ in which $R''$ and $R'''$ are as defined above and $n$ is a positive integer ranging in value from 2 to 3.

2. The method which comprises heating in a closed system at a temperature of at least about 230° C., a mixture of (A) monomethyltrimethoxysilane and from about 0.1 to about 20 percent by weight based on the weight of A of (B) a compound selected from the group consisting of alkali metal oxides, alkali metal alkoxides of less than 4 carbon atoms, alkali metal amides, alkali metal silanolates and alkali metal salts of low molecular weight siloxanols whereby silanes are produced having the formula $(CH_3)_n Si(OCH_3)_{4-n}$ in which each $n$ is a positive integer ranging in value from 2 to 3.

References Cited in the file of this patent
UNITED STATES PATENTS
2,723,984    Bailey _____ Nov. 15, 1955

UNITED STATES PATENT OFFICE
CERTIFICATE OF CORRECTION

Patent No. 3,105,086                  September 24, 1963

John W. Ryan

It is hereby certified that error appears in the above numbered patent requiring correction and that the said Letters Patent should read as corrected below.

Column 1, line 65, for "$R_aSI(OR')_{4-a}$" read -- $R_aSi(OR')_{4-a}$ --; column 2, line 8, for "$(CH_5)_3SiOMe$" read -- $(C_6H_5)_3SiOMe$ --; line 46, for "and" read -- to --.

Signed and sealed this 17th day of November 1964.

(SEAL)
Attest:

ERNEST W. SWIDER                  EDWARD J. BRENNER
Attesting Officer                  Commissioner of Patents